US008433999B2

(12) United States Patent
Hicks et al.

(10) Patent No.: US 8,433,999 B2
(45) Date of Patent: Apr. 30, 2013

(54) METHOD AND APPARATUS FOR RETRIEVING AND EDITING DYNAMICALLY GENERATED CONTENT FOR EDITABLE WEB PAGES

(75) Inventors: Ryan Hicks, Seattle, WA (US); Alex Berg, Seattle, WA (US); Simon Gershey, Seattle, WA (US); Steve Apel, Seattle, WA (US)

(73) Assignee: wetpaint.com, inc., Seattle, WA (US)

( * ) Notice: Subject to any disclaimer, the term of this patent is extended or adjusted under 35 U.S.C. 154(b) by 1057 days.

(21) Appl. No.: 11/842,807

(22) Filed: Aug. 21, 2007

(65) Prior Publication Data

US 2009/0055460 A1  Feb. 26, 2009

(51) Int. Cl.
  G06F 17/00  (2006.01)
(52) U.S. Cl.
  USPC .......................................... 715/234; 715/255
(58) Field of Classification Search .................. 715/234, 715/205–207, 210, 255
  See application file for complete search history.

(56) References Cited

U.S. PATENT DOCUMENTS

| | | | |
|---|---|---|---|
| 5,845,299 A | 12/1998 | Arora et al. | |
| 6,601,057 B1 | 7/2003 | Underwood et al. | |
| 6,745,238 B1 | 6/2004 | Giljum et al. | |
| 6,950,991 B2 | 9/2005 | Bloomfield et al. | |
| 7,000,184 B2* | 2/2006 | Matveyenko et al. | 715/235 |
| 7,152,207 B1 | 12/2006 | Underwood et al. | |
| 7,191,405 B1 | 3/2007 | Jaramillo | |
| 7,316,003 B1* | 1/2008 | Dulepet et al. | 717/111 |
| 7,340,673 B2 | 3/2008 | Malone | |
| 7,359,977 B2* | 4/2008 | Lewis | 709/229 |
| 7,430,712 B2 | 9/2008 | Arokiaswamy | |
| 7,500,182 B2* | 3/2009 | Kelly | 715/234 |
| 7,500,183 B2* | 3/2009 | Kelly | 715/234 |
| 7,523,403 B2 | 4/2009 | Karatal et al. | |
| 7,536,641 B2* | 5/2009 | Rosenstein et al. | 715/234 |
| 7,624,342 B2* | 11/2009 | Matveyenko et al. | 715/255 |
| 7,668,913 B1* | 2/2010 | Underwood et al. | 709/205 |
| 7,676,505 B2 | 3/2010 | Chess et al. | |
| 7,703,004 B2 | 4/2010 | Bier | |
| 7,716,352 B2* | 5/2010 | Leetaru et al. | 709/229 |
| 7,770,122 B1* | 8/2010 | Shaik | 715/744 |
| 7,823,057 B1 | 10/2010 | Schultz et al. | |
| 8,176,417 B2* | 5/2012 | Underhill et al. | 715/243 |
| 8,191,038 B1* | 5/2012 | Samuel et al. | 717/106 |

(Continued)

OTHER PUBLICATIONS

Hatem, AJAX RSS Reader Step by Step Tutorial; AJAX RSS reader step by step.pdf; http://web.archive.org/web/20060318191825/http://ajax.phpmagazine.net/2005/11/ajax_rss_reader_step_by_step_t.html.*

(Continued)

Primary Examiner — Doug Hutton, Jr.
Assistant Examiner — Benjamin Smith
(74) Attorney, Agent, or Firm — Perkins Coie LLP

(57) ABSTRACT

A method and system for WYSIWYG editing of dynamic content on editable web pages. Generated content is content that is received periodically from a dynamic source. Generated content may be represented on an editable web page by instructions that describe how to generate the dynamic content. The generated content system presents generated elements in a non-editable manner while allowing modification of their instructions and also allowing complete editing functionality of any surrounding static content. Thus, the generated content system allows the user to include generated content in an editable web page in a way that clearly identifies the generated content during editing and still allows the user to modify the content.

18 Claims, 5 Drawing Sheets

U.S. PATENT DOCUMENTS

| | | | | |
|---|---|---|---|---|
| 2002/0069204 | A1 | 6/2002 | Kahn et al. | |
| 2002/0073125 | A1 | 6/2002 | Bier | |
| 2003/0204810 | A1* | 10/2003 | Dam et al. | 715/500 |
| 2004/0083294 | A1* | 4/2004 | Lewis | 709/228 |
| 2004/0148307 | A1* | 7/2004 | Rempell | 707/102 |
| 2004/0148576 | A1* | 7/2004 | Matveyenko et al. | 715/530 |
| 2004/0172459 | A1* | 9/2004 | Schwalm et al. | 709/217 |
| 2004/0261023 | A1* | 12/2004 | Bier | 715/530 |
| 2005/0229101 | A1* | 10/2005 | Matveyenko et al. | 715/530 |
| 2005/0240864 | A1* | 10/2005 | Leetaru et al. | 715/513 |
| 2006/0143562 | A1* | 6/2006 | Seurig et al. | 715/513 |
| 2006/0200751 | A1 | 9/2006 | Underwood et al. | |
| 2006/0224697 | A1 | 10/2006 | Norris | |
| 2006/0248442 | A1* | 11/2006 | Rosenstein et al. | 715/501.1 |
| 2007/0162846 | A1 | 7/2007 | Cave et al. | |
| 2007/0185927 | A1* | 8/2007 | Chess et al. | 707/203 |
| 2008/0072164 | A1* | 3/2008 | Park | 715/762 |
| 2008/0172608 | A1* | 7/2008 | Patrawala et al. | 715/255 |
| 2008/0209311 | A1* | 8/2008 | Agronik et al. | 715/234 |
| 2008/0270905 | A1 | 10/2008 | Goldman | |
| 2008/0307310 | A1 | 12/2008 | Segal et al. | |
| 2008/0313260 | A1* | 12/2008 | Sweet et al. | 709/201 |
| 2009/0055755 | A1 | 2/2009 | Hicks et al. | |
| 2009/0083633 | A1* | 3/2009 | Toner | 715/733 |
| 2009/0259934 | A1* | 10/2009 | Prisament | 715/234 |
| 2010/0205551 | A1* | 8/2010 | Underwood et al. | 715/760 |

OTHER PUBLICATIONS

Final Office Action for U.S. Appl. No. 11/842,786, Mail Date Feb. 3, 2011, 14 pages.

Non-Final Office Action for U.S. Appl. No. 11/842,786, Mail Date Jul. 23, 2010, 15 pages.

* cited by examiner

FIG. 4

METHOD AND APPARATUS FOR RETRIEVING AND EDITING DYNAMICALLY GENERATED CONTENT FOR EDITABLE WEB PAGES

BACKGROUND

Editable web pages are becoming more and more common on the Internet. An editable web page (sometimes called a wiki) is a page of a website that allows visitors of the page to easily add, remove, and otherwise edit and change available content. An editable web page enables users to write documents in a simple markup language using a web browser. Users may add links to other pages to an editable web page. A defining characteristic of editable web page technology is the ease with which users can create and update web pages. Many edits can be made in real time, and appear online almost instantaneously. Often, there is no review before modifications are accepted. Many editable web pages are open to the public without the need to register any user account. Private editable web page servers require user authentication to edit, and sometimes even to read, editable web pages and provide greater security and authenticity to the content. The overall ease of interaction and operation makes an editable web page an effective tool for mass collaborative authoring and distribution of up-to-date information.

The manner in which users edit content varies among editable websites. Simple editable websites allow only basic text formatting, whereas editable websites that are more complex have support for tables, images, formulas, or even interactive elements such as polls and games. Many basic editable websites consider HyperText Markup Language (HTML) too difficult for inexperienced users to manipulate directly, and therefore only allow users to contribute plain text content to the website. This method severely limits the types of content that users can add to the website. Other intermediate editable websites have created a special language that users can use to add formatted content. For example, one convention is to treat an asterisk (*) before an item as a user request to add that item to a bulleted list. This method allows users to add more types of content, but requires that the users learn the special language and limits the users to the types of content that the language provides. More advanced editable websites allow users to edit HTML directly. Making typical HTML source code visible makes the actual text content very hard to read and edit for most users. Allowing users to edit HTML also allows users to add potentially malicious or inappropriate content to a website. For example, a user can add a link that displays one target piece of content, but actually navigates to another piece of content when a user clicks on the target link. Allowing users to edit HTML directly also reduces the consistency between editable web pages that are part of the same editable website because it is difficult to enforce one standard for editing or formatting the HTML code.

Some recent wiki engines use a different method: they allow "WYSIWYG" (What You See Is What You Get) editing, usually by means of JavaScript or an ActiveX control that translates graphically entered formatting instructions, such as "bold" and "italics," into the corresponding HTML tags. In those implementations, the markup of a newly edited HTML version of the page is generated transparently, and the user is shielded from these technical details. This method provides many formatting options to the user with great ease of use. WYSIWYG editors work well with standard Internet content types such as text, photographic images, and video.

Dynamic content is becoming more and more common on the Internet and user demand to incorporate such content on editable web pages is growing, creating a new set of challenges for editable platforms. For example, an author of an editable website may want to include data such as Really Simple Syndication (RSS) feeds (also occasionally known as Rich Site Summary or RDF Site Summary feeds), stock quotes, weather, or even seismic data that changes frequently. Manually editing the web page every time the dynamic content changes would create a substantial burden on the author of the page. For the sake of consistency, it is important that dynamic updates to content be reflected on available versions of editable web pages. To preserve the WYSIWYG paradigm, which allows users to make direct changes to content, the WYSIWYG platform would need to accommodate rapidly changing data feeds such as RSS and RDF.

There is a need for a system that solves the problems outlined above, as well as one that provides additional benefits.

BRIEF DESCRIPTION OF THE DRAWINGS

FIG. 4 is a display page produced by the system that shows a generated content element when viewing an editable web page.

Figure 1:
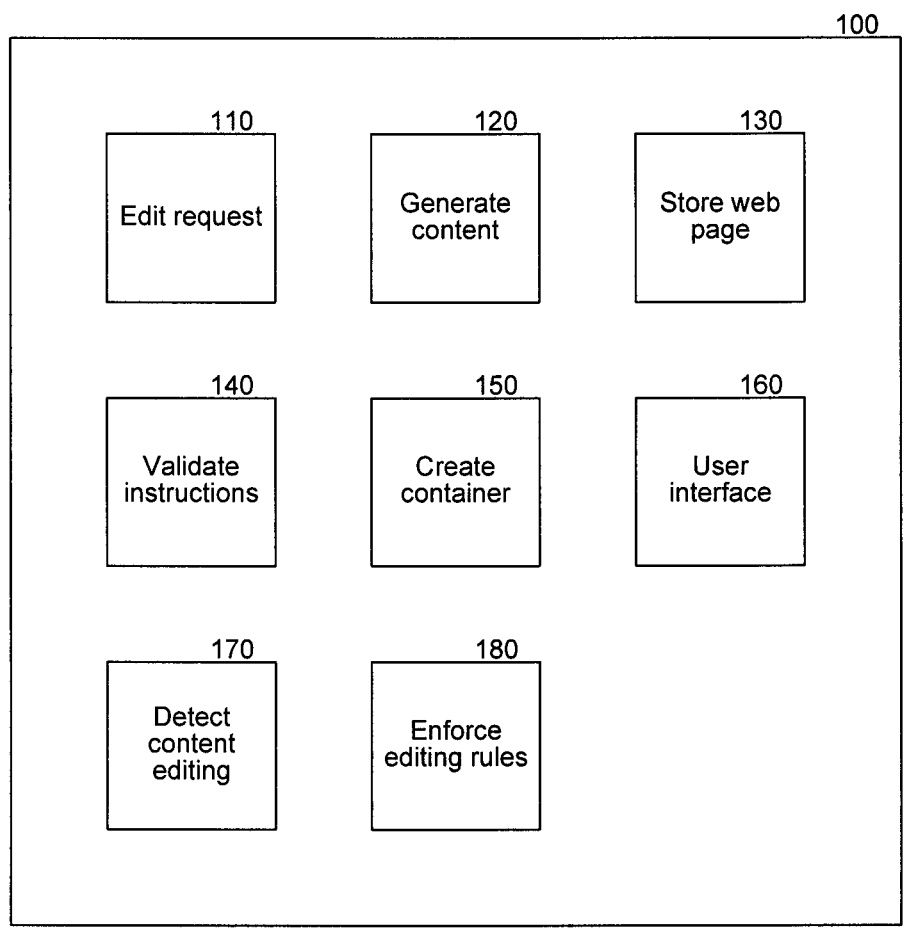
FIG. 1 is a block diagram that illustrates components of a generated content system.

The headings provided herein are for convenience only and do not necessarily affect the scope or meaning of the claimed invention.

DETAILED DESCRIPTION

A method and system for WYSIWYG editing of dynamic content on editable web pages is provided, sometimes referred to herein as the generated content system. Generated content is content that is received periodically from a dynamic source. Generated content is generally represented on an editable web page by instructions that describe how to generate the dynamic content. In some embodiments, the generated content system presents generated content elements in a non-editable manner while allowing modification of their instructions and allowing complete editing functionality of the surrounding static content.

The generated content system enables users to easily add generated content elements to an editable web page. The generated content system receives a request to add generated content to an editable web page. The request includes instructions describing how to generate the generated content. For example, the instructions may identify a source from which to retrieve the content (e.g., YouTube), an identifier that distinguishes the content from other content at the specified source, and attributes describing how the generated content should be formatted when the editable web page is displayed. The generated content system executes the instructions to generate an initial view of the content, and then stores the generated content. For example, if the instructions specify JavaScript commands, then the generated content system executes the JavaScript commands to retrieve the initial view of the content. When a user subsequently attempts to edit a web page containing generated content, the generated content system displays an indication that the user can edit the instructions but not the current view of the generated content. For example, the generated content system may replace the generated content element with a text box that allows modification to the instructions and explains why the user cannot modify the content directly. Thus, the generated content system allows the user to include generated content in an editable web page in a way that clearly identifies the generated content during editing and still allows the user to modify the content.

The instructions for describing the generated content may contain a variety of information. For example, the instructions may describe the position of the generated content on the editable web page, including the height, width, alignment (e.g., centered), and other positional information about the content. The instructions may also describe the source from which the generated content system can retrieve updated versions of the generated content. For example, the instructions may specify a website or other service that provides the generated content as well as a path or other information for locating the content on the source service. The instructions may also describe the duration that the generated content is valid or a refresh interval after which the generated content system should refresh the generated content. For example, the instructions may indicate that the generated content system should refresh the generated content once per day. In some embodiments, the server hosting the editable web page may update the generated content according to a schedule so that clients viewing the web page need only display the version of the generated content provided by the server. The instructions may also contain scripting code, such as Asynchronous JavaScript and XML (AJAX) code, which describes how to retrieve or format the generated content.

Editable web page content, HTML content, and other references to content herein can describe many different types of content associated with an editable web page. For example, editable web page content may include plain text, formatted text, graphics, videos, sound files, RSS feeds, YouTube videos, Google Calendars, maps, PhotoBucket slideshows, links to external content hosted on other servers, or any other type of content typically available on the Internet. In some embodiments, the generated content system provides a design or editing mode for each editable web page. For example, each web page may have an "Edit" button that, when selected, causes the web page to switch from a viewing mode to a design mode in which a user can edit the content of the web page. Upon entering the design mode, the generated content system differentiates between editable web page content and generated content and prevents the user from directly editing the generated content. Instead, the generated content system provides methods to modify the instructions by which that content is generated. In addition, the generated content system may attempt to make the web page look similar in the design mode to the way it does in the viewing mode.

Aspects of the invention will now be described with respect to various embodiments. The following description provides specific details for a thorough understanding of, and enabling description for, these embodiments of the invention. However, one skilled in the art will understand that the invention may be practiced without many of these details. In other instances, well-known structures and functions have not been shown or described in detail to avoid unnecessarily obscuring the description of the embodiments of the invention.

The terminology used in the description presented herein is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

FIG. 1 is a block diagram that illustrates components of a generated content system 100 in one embodiment. The system contains an edit request component 110, a generate content component 120, a store web page component 130, a validate instructions component 140, a create container component 150, a user interface component 160, a detect content editing component 170, and an enforce editing rules component 180. The edit request component 110 receives requests to edit an editable web page from various users. The edit request component 110 may send the requesting user a different version of the web page designed for editing. The generate content component 120 generates any generated content by executing the instructions specified within a generated content element. The store web page component 130 stores the editable web page. The web page may be stored on a server accessible to many users, and modifications received from each of the users may be stored in a change log associated with the web page. The validate instructions component 140 optionally validates new instructions received from users describing generated content elements as described further herein. The create container component 150 may create an HTML or other container to isolate a generated content element from other elements on an editable web page. The user interface component 160 interacts with the user and provides visual indications of the content that can be edited and the manner in which it can be edited. For example, the user interface component 160 may restrict editing of generated content elements so that the user can edit the instructions for generating the element, but not directly edit the generated content. The detect content editing component 170 detects when the user is editing a static element or a dynamic element and performs any special processing specific to each element type. The enforce editing rules component 180 contains the rules that specify how generated content can be edited and ensures that users can only edit generated content according to the restrictions specified by the editing rules.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer while corresponding portions reside on a client computer such as a mobile or portable device, and thus, while certain hardware platforms are described herein, aspects of the invention are equally applicable to nodes on a network.

The generated content system allows users to add a generated content element to an editable web page by submitting one or more instructions describing the manner in which the content is generated. For example, the instructions may specify the source of the content, the frequency that the content should be updated by carrying out the instructions to regenerate the content, and so forth.

The following examples illustrate several types of instructions accepted by the generated content system for describing generated content.

Example A, RSS feeds:

```
<div class="wp-field wp-rss wp-rss-total-5"><a
href="http://news.google.com/news?hl=en&q=lily+allen&um=1&tab=
wn&ie=UTF-8&output=rss"></a></div>
```

The "wp-field" indicates that the content is generated by the system and should not be modified by the user.

The "wp-rss" indicates that the content is sourced from an RSS feed.

The "wp-rss-total" indicates how many records to display from the designated RSS feed. In this case, the generated content system is instructed to render 5 images.

The href of the anchor tag identifies the external resource from which to retrieve the RSS feed data.

Example B, tables of contents:

<div class="wp-field wp-toc"></div>

The "wp-field" indicates that the content is generated by the system and should not be modified by the user.

The "wp-toc" indicates that the content is a Table of Contents derived from the non-generated content on the page (e.g., by searching through the H1, H2, and H3 tags).

Example C, author information:

```
<div class="wp-field wp-byline"><a
href="http://www.lilyallenwiki.com/account/ryanh"></a></div>
```

The "wp-field" indicates that the content is generated by the system and should not be modified by the user.

The "wp-byline" indicates that the content is an author's byline and the content should be sourced from the author's profile information.

The href of the anchor tag identifies the external resource from which to retrieve the author's information, such as name, last visit date, and contact information.

Example D, global content (such as a global footer):

```
<div class="wp-field wp-externalcontent"><a
href="http://www.lilyallenwiki.com/page/globalFooter"></a></div>
```

The "wp-field" indicates that the content is generated by the system and should not be modified by the user.

The "wp-externalcontent" indicates that the content is retrieved from an external page.

The href of the anchor tag identifies the external resource from which to retrieve the external content. For example, a footer can be defined in one place on the site and rendered via the generated editing system at the bottom of any page.

In some embodiments, the generated content system validates the received instructions based on certain restrictions. For example, the host of the editable web page may prescribe that a user can only use certain sources of generated content on web pages provided by that host. As an example, the host may allow RSS feeds from popular news sites, but not from sites known to contain offensive material. The host may also restrict the types of generated content. For example, the host may allow RSS feeds but not allow instructions that contain unknown scripting instructions that could harm a user's computer. In some embodiments, the generated content system may validate separately that the instructions can be executed (e.g., that they contain valid HTML that is supported by most browsers) and that the instructions should be executed (e.g., that they meet security or content type criteria).

In some embodiments, the generated content system encapsulates the received instructions in an HTML or other container. For example, the generated content may be placed within a TABLE, EMBED, IFRAME, or other suitable HTML tag for separating the generated content from other content on the editable web page. The container may contain the instructions for generating the generated content as well as standard HTML capable of being interpreted by most web browsers for displaying the generated content. The instructions may be represented so that a standard web browser ignores the instructions when the web page is displayed for viewing, but the instructions become visible when the web page is displayed for editing. The web page may include JavaScript or other suitable scripting instructions for modifying the display of the web page between viewing and editing.

Figure 4:
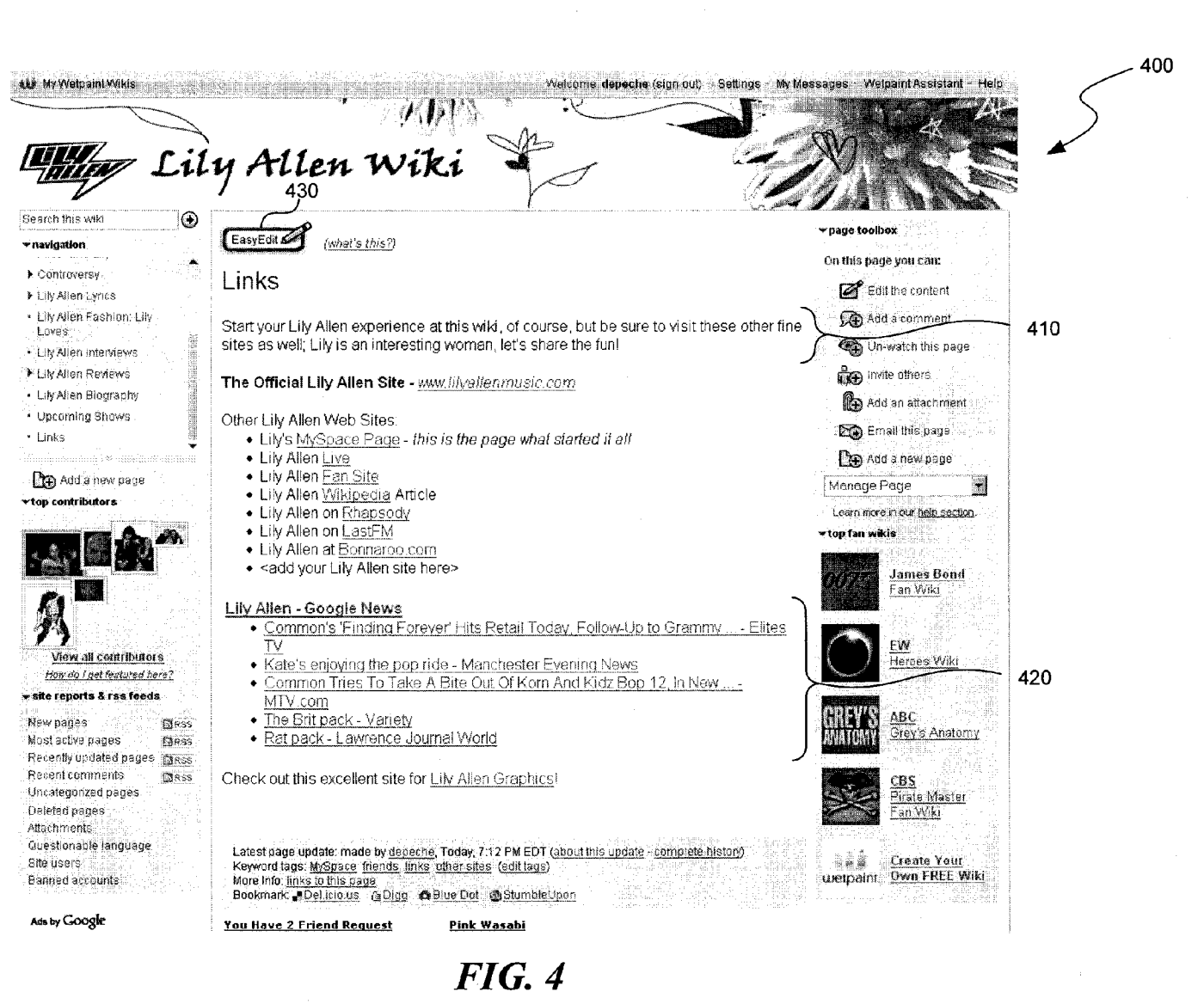

FIG. 4 is a display page produced by the system that shows a generated content element when viewing an editable web page. The web page 400 contains a static element 410 and a generated element 420. When viewing the web page, a user cannot distinguish between the static element 410 and the generated element 420. The web page is rendered by a standard web browser and appears as any other editable web page. The web page 400 also contains a control 430 for switching to an editing mode. When a user operates the control 430, an editable version of the page is displayed, such as the one in FIG. 5.

Figure 5:
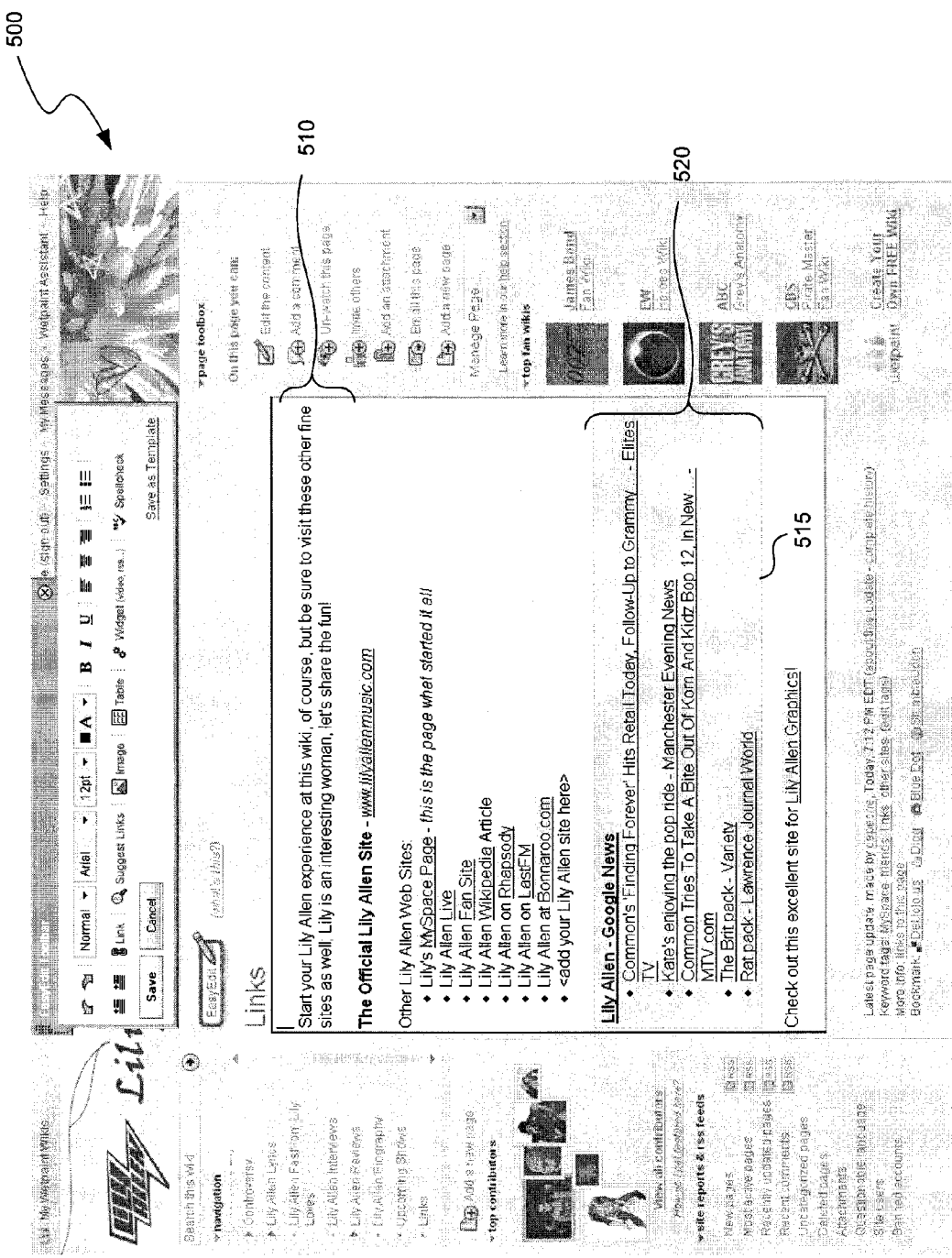
FIG. 5 is a display page produced by the system that shows a generated content element when editing an editable web page.

FIG. 5 is a display page produced by the system that shows a generated content element when editing an editable web page. The web page 500 contains a static element 510 and a generated element 520. A visual indication 515 indicates to the user that the generated content cannot be edited directly by displaying a light gray box around the content. Instead, a user can click on the generated element 520 and edit the instructions that produce the generated element 520. The generated element 520 may also contain controls for changing other editable attributes of the generated content (not shown), such as the position and size of the generated content relative to other elements on the editable web page 500.

In some embodiments, the generated content system stores only a part of the generated content. For example, the generated content may store the instructions for generating the content, but not a current view of the generated content. For content that is regularly updated, storing only a part of the generated content is appropriate because it is desirable to retrieve the latest version of the generated content when the generated content is displayed. For content that is less regularly updated, the generated content system may store a current view of the generated content with instructions for refreshing the view of the generated content. The instructions may provide an expiration time for the generated content so that if the page is displayed before the expiration date, the displaying browser will use the stored view of the generated content, whereas if the page is displayed after the expiration date, the displaying browser will retrieve an updated view of the generated content in accordance with the instructions.

In some embodiments, the generated content system restricts editing of generated content. A user may be tempted to directly edit the generated content, in a way that would not preserve the user's changes when the generated content is refreshed. For example, the user may try to edit an RSS feed by reformatting the headings or links within the RSS feed in a way that is incompatible with common conventions for displaying RSS feeds. Thus, the generated content system may prevent the user from editing the generated content directly when the editable web page is viewed for editing. Instead, the generated content system allows the user to edit the instructions that produce the generated content, as well as any attributes not related directly to the content, such as the height, alignment, or other positional information describing how the generated content is displayed on the web page relative to other content. When the user attempts to edit static content, the generated content system may freely allow editing without affecting the generated content.

Figure 2:
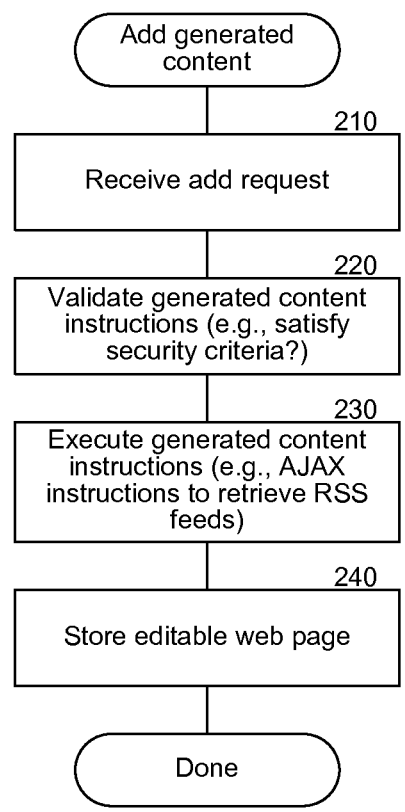
FIG. 2 is a flow diagram that illustrates the processing of the generated content system when a request is received to add a new generated content element to an editable web page.
Figure 3:
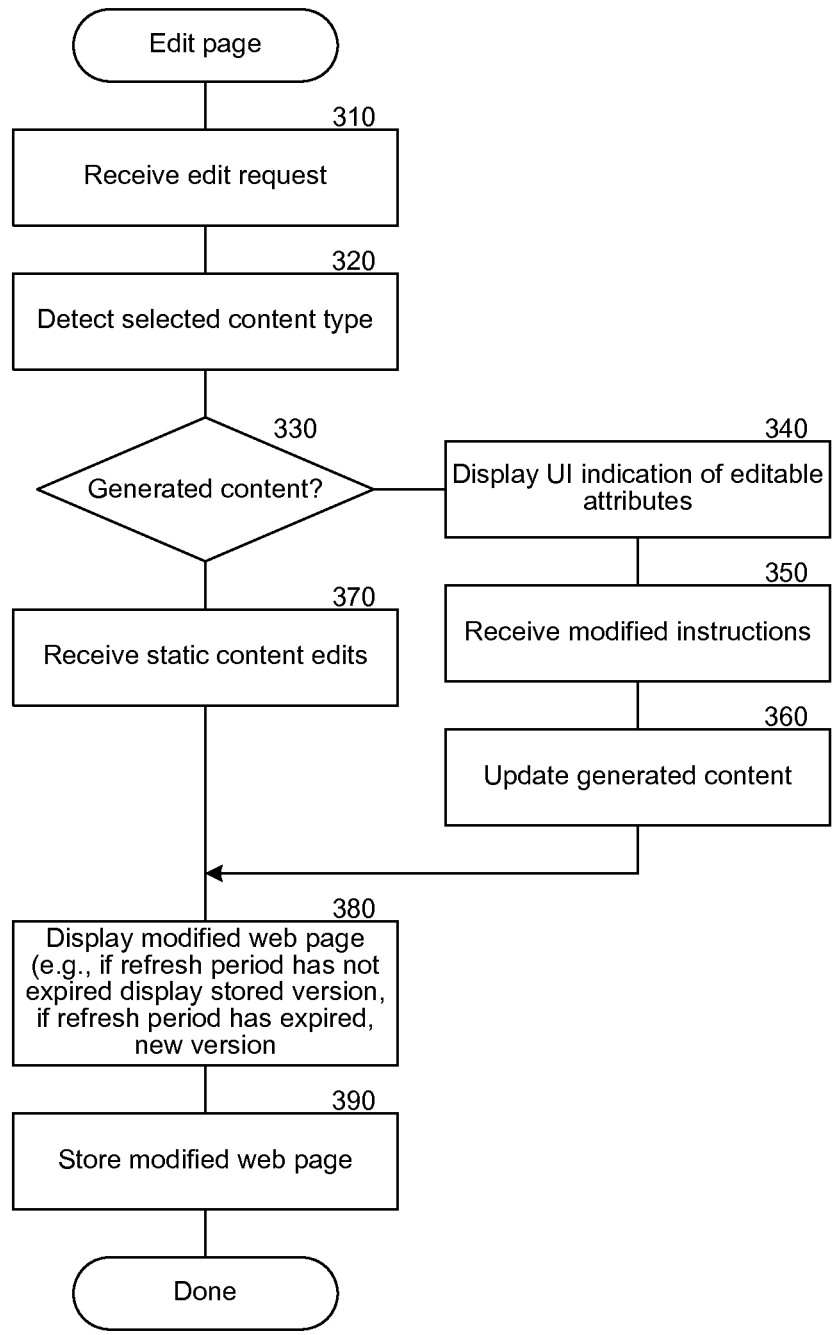
FIG. 3 is a flow diagram that illustrates the processing of the generated content system when a request is received to edit an existing generated content element of an editable web page.

FIGS. 2 and 3 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) functions not shown may be readily implemented.

FIG. 2 is a flow diagram that illustrates the processing of the components of the generated content system when a request is received to add new generated content to an editable web page in one embodiment. In block 210, the edit request component 110 receives a request to add a generated content element to an editable web page. The request specifies instructions for generating the generated content. In block 220, the validate instructions component 140 validates the received instructions. For example, the component may determine whether the instructions are syntactically correct and whether the specified source of the generated content exists. In block 230, the generate content component 120 executes the received instructions to generate an initial view of the generated content. For example, if the instructions specify retrieving an RSS feed using AJAX, then the component may execute the AJAX instructions to retrieve the latest version of the RSS feed. In block 240, the store web page component 130 stores the editable web page along with appropriate information about the generated content element. For example, the component may store the instructions for generating the element as well as a current view of the data for the generated content element. After block 240, these steps conclude.

FIG. 3 is a flow diagram that illustrates the processing of the components of the generated content system when a request is received to edit an existing generated content element of an editable web page. In block 310, the edit request component 110 receives a request from a user to edit an editable web page. In block 320, the detect content editing component 170 detects a specific element selected by the user for editing. For example, the user may select a static element or one of the generated content elements on the web page. In decision block 330, if the selected content element is a static element, then the component continues at block 370, else the component continues at block 340. In block 340, the user interface component 160 displays an indication of the editable attributes of the generated content element. For example, the component may display the instructions for generating the generated content that can be modified by the user. The component may also allow modification of positional or other attributes that relate to how the generated content is presented within the editable web page. In block 350, the validate instructions component 140 receives the modified instructions or other attributes and validates that the modifications are acceptable according to one or more formatting or security criteria that apply to the generated content element. For example, the generated content system may utilize a white list of acceptable tags (e.g., HTML) and/or scripting instructions that can safely be used in the generated content instructions or a blacklist of unacceptable tags that cannot be used. The generated content system may also limit the sources that can be specified in the instructions for supplying generated content. In block 360, if the instructions were modified, then the generate content component 120 updates the generated content based on the modified instructions. In block 370, the system receives any static content edits. In block 380, the user interface component 160 displays the modified editable web page to the user. In block 390, the store web page component 130 stores the modifications that the user made to the editable web page for future display to other users. After block 390, these steps conclude.

CONCLUSION

From the foregoing, it will be appreciated that specific embodiments of the generated content system have been described herein for purposes of illustration, but that various modifications may be made without deviating from the spirit and scope of the invention. For example, although HTML has been primarily described, other languages for specifying editable content also work well with the system. Languages such as XML, RDF (often used for social networking), and RTF each can be used to provide editable content that can include generated content using the methods described above. The techniques described can also be used with many additional platforms, such as Binary Run-time Environment for Wireless (BREW), Java 2 Micro Edition (J2ME), and Java 2. Generated content can include many varied types of content that change over time such that a user benefits from specifying the content in a way that the content can update automatically when the content changes rather than requiring manual updates by the user. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A computer implemented method for adding dynamically generated content to an editable web page, the method comprising:

receiving, with a computer, a request from a user to add dynamically generated content that is to be retrieved from an external source to an editable web page;

receiving, with a computer, instructions describing where to retrieve the dynamically generated content and how to add the dynamically generated content into a webpage;

executing, with a computer, the instructions to generate an initial view of the dynamically generated content and instructions for generating one or more items of static content;

displaying, with a computer, the initial view of the dynamically generated content and the one or more items of static content to allow the user to review the addition of the dynamically generated content to the editable web page with a WYSIWYG editor;

receiving, with the computer, an indication that a user wishes to edit the dynamically generated content, producing a display in which a user can revise the instructions for retrieving and/or adding the dynamically generated content that includes a distinct visual feature surrounding the dynamically generated content, and wherein the distinct visual feature indicates content that the user is prevented from editing directly;

receiving, with the computer, revised instructions to add the dynamically generated content; and storing, with a computer, the instructions for generating the one or more items of static content along with the revised instructions describing how to retrieve and add the dynamically generated content.

2. The method of claim 1 including after receiving the instructions, validating, with the computer, that the instructions can be executed.

3. The method of claim 1 including after receiving the instructions, validating, with the computer, that the instructions satisfy a security criteria.

4. The method of claim 1 wherein storing the instructions comprises creating an HTML container containing the instructions.

5. The method of claim 1 wherein storing the editable web page comprises saving, with the computer, the initial view of the dynamically generated content.

6. The method of claim 1 wherein the instructions describe how often the dynamically generated content should be refreshed.

7. The method of claim 1 including subsequently displaying the dynamically generated content, wherein displaying the dynamically generated content comprises:

determining, with the computer, whether a refresh period specified in the received instructions has expired;

when the refresh period has not expired, displaying, with the computer, a stored version of the dynamically generated content; and when the refresh period has expired, executing, with the computer, the instructions to retrieve a new version of the dynamically generated content and displaying the new version of the dynamically generated content.

8. The method of claim 1 wherein the instructions describe an address of the external source of the dynamically generated content.

9. The method of claim 1 including when the editable web page is displayed for viewing, formatting, with the computer, the dynamically generated content as valid HTML that is interpretable by any web browser that supports Internet standards.

10. A non-transitory, computer-readable storage medium encoded with instructions that when executed by a computer cause the computer to allow dynamically generated content to be edited on an editable web page, by a method comprising:

receiving a request to edit an editable web page, wherein the web page contains one or more items of static content and dynamically generated content that is retrieved from an external source and is described by instructions describing where to retrieve the dynamically generated content and how to add the dynamically generated content into a web page;

detecting an attempt to edit the dynamically generated content;

when an attempt to edit the dynamically generated content is detected, producing a display in which the user can revise the instructions describing how to add the dynamically generated content and a distinct visual feature surrounding the dynamically generated content, wherein the display is produced in a WYSIWYG manner so that a user can preview how the one or more items of static content and the dynamically generated content appear on the web page as a result of the revised instructions, and wherein the distinct visual feature indicates content that the user is prevented from editing directly; and storing the revised instructions for adding the dynamically generated content along with instructions for generating the one or more items of static content on the web page.

11. The non-transitory, computer-readable medium of claim 10 including instructions for displaying a visual indication that the user cannot edit the dynamically generated content directly.

12. The non-transitory, computer-readable medium of claim 10 further comprising instructions that allow revision of the instructions describing a position of the dynamically generated content relative to other content on the editable web page.

13. The non-transitory, computer-readable medium of claim 10 wherein the editable web page also contains static content and further comprising instructions for allowing a user to edit the static content without affecting the dynamically generated content.

14. The non-transitory computer-readable medium of claim 10 wherein the dynamically generated content is an RSS feed retrieved via AJAX.

15. A computer system for including dynamically generated content in an editable web page, the system comprising:

a processor that is configured to execute programmed instructions that provide a number of components including:

an editing request component configured to receive requests to edit an editable web page from a user, wherein the request includes an indication of an external source from which dynamically generated content is to be retrieved and instructions for adding the dynamically generated content into a web page;

a display component configured to produce a display in which a user can revise the instructions that describe how to add the dynamically generated content but not to edit the dynamically generated content directly, wherein the display is shown in conjunction with a distinct visual feature surrounding the dynamically generated content, and wherein the distinct visual feature indicates content that the user is prevented from editing directly;

a generate content component configured to carry out the revised instructions describing how to add the dynamically generated content to produce a current view of the dynamically generated content, wherein the current view shows one or more items of static content and the dynamically generated content in a WYSIWYG manner; and a store web page component configured to store instructions for generating the one or more items of static content on the editable web page including the revised instructions describing how to add the dynamically generated content.

16. The computer system of claim 15 wherein the instructions further include a validate instructions component configured to enforce formatting and security rules related to the instructions.

17. The computer system of claim 15 wherein the instructions further include an editing rules component configured to enforce restrictions describing how dynamically generated content can be edited.

18. The system of claim 15 including a user interface component configured to provide an indication to a user of a manner in which the instructions for generating the dynamically generated content can be revised.

* * * * *

UNITED STATES PATENT AND TRADEMARK OFFICE
CERTIFICATE OF CORRECTION

| | | |
|---|---|---|
| PATENT NO. | : 8,433,999 B2 | Page 1 of 1 |
| APPLICATION NO. | : 11/842807 | |
| DATED | : April 30, 2013 | |
| INVENTOR(S) | : Hicks et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1159 days.

Signed and Sealed this
Sixteenth Day of December, 2014

Michelle K. Lee
*Deputy Director of the United States Patent and Trademark Office*